June 18, 1968  R. W. DOCHTERMAN  3,388,459
METHOD OF FABRICATING SMALL ELECTRIC MOTORS
Filed Oct. 22, 1965
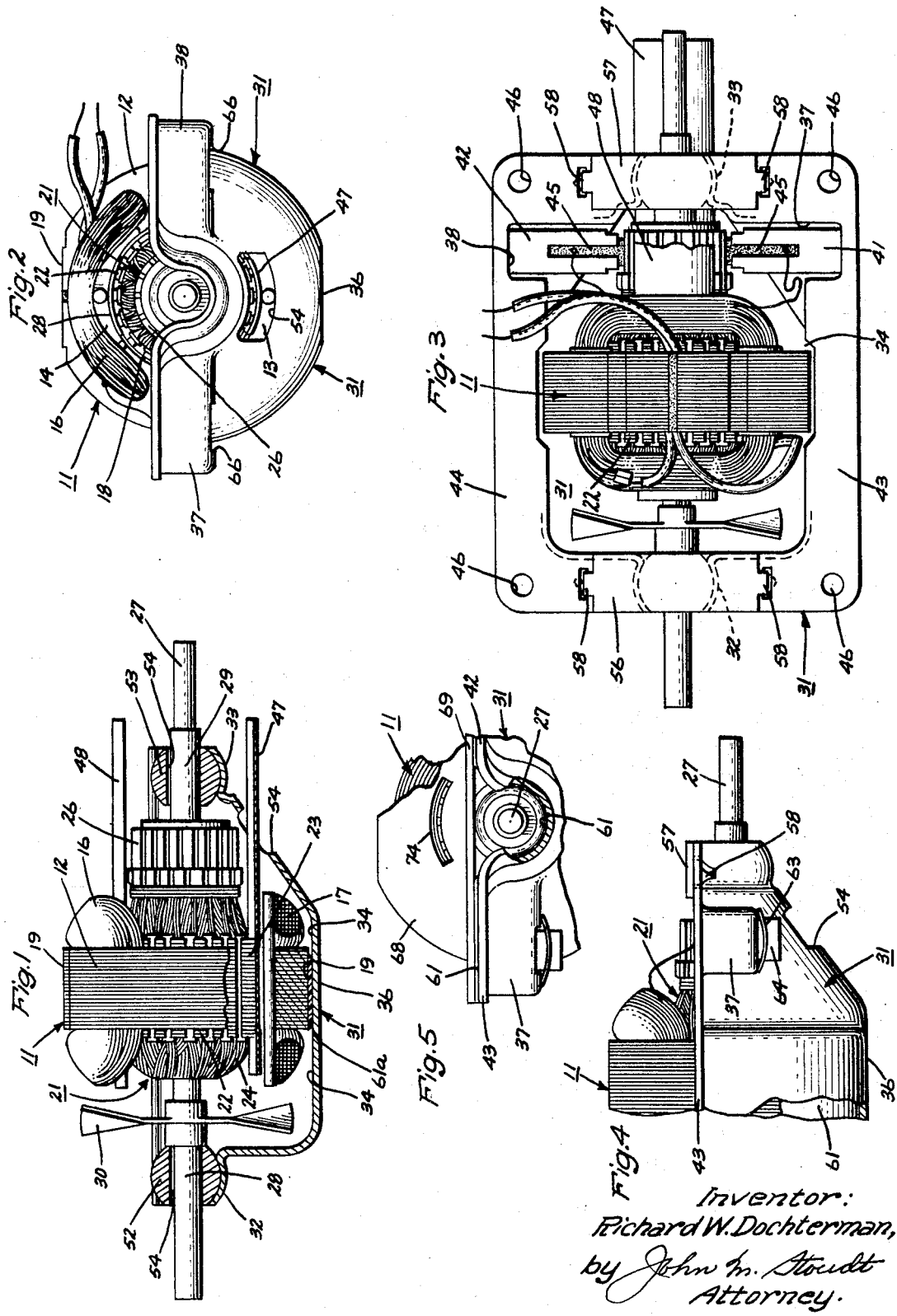
Inventor:
Richard W. Dochterman,
by John M. Stoudt
Attorney.

United States Patent Office 3,388,459
Patented June 18, 1968

3,388,459
METHOD OF FABRICATING SMALL
ELECTRIC MOTORS
Richard W. Dechterman, Fort Wayne, Ind., assignor to
General Electric Company, a corporation of New York
Filed Oct. 22, 1965, Ser. No. 501,556
4 Claims. (Cl. 29—596)

ABSTRACT OF THE DISCLOSURE

In the fabrication of machines having rotatable components, in particular small and fractional horsepower size electric motors having spaced apart self-aligning sleeve type bearings, the stator and rotatable assemblies are initially held together as a single unit with the shaft of the unit being received in the bores of self-aligning type bearings which are in turn received in complementary seats of a frame. The bearings and shaft are aligned by initially supporting the stator and rotatable assembly unit on the bearings, with the stator being in non-engaging and unsupported relation relative to the frame, and while this relation exists, securing the bearings in their frame seats. In this way, the weight of both the stator and rotatable assemblies may be used to effect alignment of the self-aligning bearings before the stator is secured to the frame, especially desirable in small motors having frames formed of single-piece relatively thin sheet material. Moreover, proper alignment between the bearings and shaft, and a proper air gap dimension between the stator and rotatable assembly may be consistently achieved on a mass production basis even though individual components of the motor are quite small and self-aligning type bearings are employed.

Background of the invention

The present invention relates to the fabrication of machines having rotatable components and in particular to an improved method of fabricating small and fractional horsepower size electric motors having a rotatable assembly supported for revolution by a pair of spaced apart bearings.

One type of machine including rotatable components is the fractional horsepower electric motor incorporating a rotatable assembly having a magnetic core secured to a shaft. In the interests of economy, a pair of spaced apart sleeve or journal bearings are usually employed to support the shaft on either side of the core, the bearings being mounted in a molded or cast frame which also supports the stator of the motor. In an effort to realize additional economies for the motor, it has been proposed that the frame be formed from a single piece of relatively thin sheet metal material, such as steel or the like. Although a reduction in construction costs is possible by this latter approach, unfortunately a practical difficulty has been presented in achieving the proper alignment between the bearings and shaft. That is to say, in view of the type of frame, desirable co-axial relation between the internal bearing surfaces and between each surface and the journal of the shaft has been difficult to obtain with any degree of consistency, regardless of the assembly fixtures utilized in the fabrication of the motors. Moreover, the consistent attainment of the highly desirable air gap having uniform radial cross-section between the rotatable core and stator has also presented a practical problem for this type of motor.

Summary of the invention

Consequently, it is a primary object of the present invention to provide an improved method of fabricating machines having rotatable assemblies, such as small electric motors, and it is a more specific object to provide a method of fabricating such machines which overcomes the difficulties and problems mentioned above.

It is a further object of this invention to provide an improved yet highly economical method of fabricating a low cost small electric motor having a frame formed of sheet material which mounts a pair of sleeve type bearings for journalling the rotatable assembly in which proper alignment of the bearings is achieved without the need for expensive assembly fixtures in spite of the economies permitted in the structural features of the motor.

In carrying out the objects of the present invention in one form, I provide an improved method of fabricating a machine having a rotatable assembly supported for revolution by a pair of spaced apart journal sleeve type bearings mounted by a single-piece frame member formed of rigid sheet material, such as steel. Initially, the stator assembly and rotatable assembly are held together as a unit in a non-movable relation with a fixed air gap of preselected cross-section being formed between the magnetic cores of the assemblies. In addition, the shaft of the rotatable assembly is received in the bores of the pair of bearings which are formed with partially spherical outer surfaces movably seated in accommodating spaced apart recesses opening upwardly of the single-piece frame member. A cavity is furnished in the frame member between the pair of recesses to receive the stator and rotatable assembly unit in a non-engaging and non-supporting relation such that the frame does not interfere with or impede relative movement between the individual bearings and their accommodating recesses, which in effect have fixed relative positions since the frame is constructed in a single piece of rigid material.

Further, the full weight of the stator and rotatable assembly unit is carried via the shaft journal on the bores of the two bearings so that the weight of the unit causes the bearings to move angularly in the associated frame recess relative to both the frame and shaft axis until they assume the desired positions. In other words, the bearing bores become co-axially aligned as dictated by the finally finished shaft journals which they will ultimately support. Thereafter, the bearings are firmly secured in the frame recesses while the bearing bores continue to support the stator and rotatable assembly unit to maintain the already established alignment. Subsequently, the stator and frame are fastened together, and the stator and rotatable assembly are released for relative rotation.

In this way, it is practical to fabricate the frame of the motor in a single-piece from relatively thin sheet metal material if desired and in spite of this economy, still provides the desired alignment between the bearings and shaft and the proper motor air gap. Moreover, additional economies may be realized in the practice of my invention since it is possible to produce the motor with the desired alignment qualities without assistance from any assembly fixture whatsoever.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing which illustrates the preferred embodiment of the invention.

Brief description of the drawing

In the drawing:

FIGURE 1 is a side elevational view, partly broken away and partly in section, of armature and stator assemblies being supported by a pair of self-aligning sleeve type bearings which in turn are movably supported by a single piece motor frame during fabrication of the example motor by the preferred form of the present invention;

FIGURE 2 is an end view seen from the right side of the motor shown in FIGURE 1;

FIGURE 3 is a plan view of the motor of the exemplification as it appears after it has been fabricated by the present invention;

FIGURE 4 is a partial side view of one end of the finally assembled motor of FIGURE 3; and FIGURE 5 is a partial end view, partly broken away to show detail, of a modified form of the example motor fabricated by the present invention.

*Description of the preferred embodiment*

Turning now to the figures in more detail, the preferred form of the present invention is illustrated in connection with the fabrication of a fractional horsepower electric motor of the series type; i.e., a commuated motor adapted to be operated in either direct current or alternating current in which the armature winding and stator field winding are electrically connected in series. In the exemplification, the motor includes a stator 11 of the salient pole type similar to that shown and described in the H. E. Vance Patent No. 2,961,556 issued on Nov. 22, 1960. It has a laminated core 12, formed of a stack of stamped out magnetic laminations, the core having two opposed salient poles 13, 14 respectively carrying field winding coils 16, 17 and a central generally cylindrically shaped bore 18 defined by the arcuate tips of the poles. In addition, the outer transverse periphery of the core located directly over the poles has flats denoted by numeral 19.

The rotatable assembly 21 is conventionally constructed with a laminated rotor core or armature 22 formed with a cylindrical outer periphery 23, which carries a secondary wound winding 24 electrically joined to the bars of a standard commutator 26. Core 22 and commutator 26 are secured adjacent one another to rotate with a shaft 27 between a pair of highly finished shaft journals 28, 29. A fan 30 is also attached to the shaft between the side of the core 22, remote from commutator 26, and journal 28. The rotor core, fan 30, and commutator 26 may all be attached to the shaft by any suitable means, such as an interference fit therewith.

The frame of the motor, indicated generally by numeral 31, is fabricated from a single sheet of relatively thin rigid material, such as .025 inch thick steel, and drawn or otherwise formed into the desired configuration. In the illustrated form, the frame is provided with a pair of spaced apart bearing supporting recesses 32, 33 opening upward (as viewed in the drawing) and a relatively deep central cavity 34 also opening upward disposed therebetween. Recesses 32, 33 and cavity 34 are thus unobstructed from the same side of the frame. Preferably, for reasons which will become more apparent hereinafter, the bottom wall of the cavity is flat, as indicated at 36 in FIGURES 1 and 2. The frame is also furnished with opposed chambers 37, 38 (FIGURES 2 and 3) for mounting brush assemblies 41, 42 (FIGURE 3) and horizontal flanges 43, 44, shown in FIGURE 3, integrally joined to the outer rim of recesses 32, 33, cavity 34, and chambers 37, 38. The flanges include four holes 46 for mounting the motor as by bolts to a support (not illustrated).

During fabrication of the motor having the illustrated components, an air gap having the desired cross-section is initially established or fixed between bore 18 of stator 11 and outer core periphery 23 of the rotatable assembly in any convenient manner, such as suitable clamps engaging the stator and rotatable assembly or the pair of diametrically opposed, dimensionally similiar, steel shims 47, 48 best illustrated in FIGURE 1. Preferably, the shims furnish an air gap formed with a generally uniform cross-section throughout its axial length. Thus, the stator and rotatable assembly are held in temporarily fixed relation as an integrated unit. A self-aligning journal bearing 52, 53 each having an axial bore 54, is then slid over each end of shaft 27 until the bore of the respective bearings accommodates the associated journal of the shaft. At this time, the end of the steel shim 47 is inserted through a suitable aperture 54 provided in the frame 31 adjacent commutator 26, the bearings 52, 53 seated into their accommodating frame recesses 32, 33, and the integrated stator and rotatable assembly unit received in cavity 34. The frame preferably rests on the flat bottom wall 36 such that the axis of the shaft 27 is generally disposed in a horizontal fashion.

At this stage of the fabrication, the motor components assume the relative relationships revealed in FIGURES 1 and 2 which will now be considered. It will be seen from these figures that frame 31, being constructed from a single piece of material, provides a fixed axial position for recesses 32, 33 relative to each other. The recesses are of concave shape and conform in configuration to or are complementary with a part of the convexly curved spherical outer surface of the self-aligning bearings 52, 53 seated therein. Further, the frame wall defining cavity 34 and the bottom flat 19, as viewed in the drawing, of the stator core are in non-supporting and non-engaging relation, with the shaft journals being supported by the associated bores of bearings 52, 53. Consequently, with recesses 32, 33 opening upwardly, the bearings support the combined weight of the stator and rotatable assembly without interference from the frame. The weight which is supported through the shaft journals, in turn, forces the bearings to move or automatically turn in their associated recesses until the bearing bores become aligned with their associated shaft journal and with one another, that is, the desired parallel relation with each other is established. It should be recognized that although the shaft axis is shown horizontally, it could, of course, be supported at any angle relative to the horizontal which still permits the bearings to carry the weight of the stator and rotatable assembly for achieving the automatic bearing-shaft alignment. It will be further recognized that with the single-piece frame acting to support all of the motor components shown in FIGURES 1 and 2, no assembly fixtures are required.

Without disturbing the motor component relationships outlined above, the aligned bearings 52, 53 are firmly secured in their seats and the stator then rigidly attached to the frame 31. This may be accomplished in any convenient way. For example, generally rectangular, rigid sheet metal bearing retaining members 56, 57 (as best seen in FIGURE 3) may be positioned over the exposed spherical surface of bearings 52, 53, with tabs 58 formed on each end of the members extending through suitable apertures in flanges 43, 44. These tabs may then be twisted to the position shown in FIGURE 4 for member 57 to lock them in place relative to the bearings and frame.

With respect to the attachment of stator 11 to frame 31, the illustrated means in FIGURE 4 is a hardened adhesive material 61, such as cured epoxy resin or the like. This material may be applied in an unhardened state, denoted by numeral 61a in FIGURE 1, to the outer surface, including bottom flat 19, of the stator core or to the inner frame wall of cavity 34 at the appropriate location, or to both locations prior to assembly of the stator and rotatable assembly into the cavity. The material should, however, allow relatively free movement of the stator with respect to frame 31 as the bearings become aligned in the fashion already described and should not interfere with the primary support of the stator and rotatable assembly unit by the bearings during this aligning action. A material similar to that disclosed in the Thompson et al. Patent No. 3,165,816, issued Jan. 19, 1965, is given by way of example. If desired, unhardened material 61a may include sufficient hardeners so that it readily sets up and cures at room temperature after members 56, 57 have been secured to flanges 43, 44 or the material may be cured by the application of a controlled heat from an oven or the like (not shown).

After the foregoing hardening step has been completed, brush assemblies 41, 42 are placed into chambers 37, 38 in opposed relation to one another, the carbon brushes 45 being disposed radially to commutator 26 and further being biased into engagement by the usual coil springs (not shown). The brush assemblies are fastened to frame 31 by a conventional spring steel brush retaining clip 63 (FIGURE 4) which cooperates with a depending portion 64 of each brush assembly casing. Portion 46 extends downwardly through an aperture 66 formed in the bottom of chambers 37, 38 and the clip 63 frictionally engages portion 64 as well as the outer surface of frame 31 to lock the brush assemblies in place. Once the brush assemblies have been fastened to frame 31, shims 47, 48 are removed from the air gap, shim 47 being pulled through aperture 54 which subsequently serves as a ventilation opening, and the rotatable assembly is released for relative rotation with respect to stator 11, bearings 52, 53, and frame 31.

It will be readily apparent from the foregoing that the present invention provides, among other beneficial features, accurate co-axial alignment of bearings and the rotatable assembly in a dynamoelectric machine as well as a closely controlled air gap in spite of the use, if desired, of a one-piece frame formed from sheet material to mount the bearings and stator. Additional economies may be realized from the invention since there is no need for assembly fixtures or time consuming procedures during the practice of my invention.

It should be apparent to those skilled in the art that while I have shown and described what is considered to be the preferred embodiment of my invention in accordance with the Patent Statutes, changes may be made in the disclosed method without actually departing from the true scope and spirit of the invention. Without intending to limit such true scope and spirit, by way of illustration, FIGURE 5 shows an electric motor similar to that of FIGURES 1–4 inclusive, except that cover 68 encloses at least the stator and fan. The cover is fabricated from sheet material and is furnished with a flange 69 which is secured by hardened adhesive material 61 to flanges 42, 43 of frame 31. Aperture 74 is provided for ventilation purposes and to permit removal of the upper shim. The same type of material 61 is also utilized to secure the bearings in the proper seated positions in their associated recesses, all material 61 being hardened during the same operation. Moreover, the present invention is applicable to the manufacture of induction type motors as well as motors having self-aligning roller-bearings, among other motor constructions. I therefore intend to cover in the following claims all such equivalent variations as fall within the invention.

What I claim as new and desire to secure by Letters Patent of the United States is:

1. A method of fabricating a small electric motor having a stator and a rotatable assembly including a magnetic core secured to rotate with a shaft; the method comprising the steps of: disposing the stator and rotatable assemblies together as a unit in an adjacent relation, with a fixed air gap of preselected cross-section being formed between the stator assembly and magnetic core, with the shaft being received in the bore of a pair of self-aligning sleeve type bearings each having at least a partially spherical outer surface, and with a single-piece frame member formed from sheet material including a pair of spaced apart bearing complementary recesses opening upwardly seating part of the sperical outer surface of said bearings in a relatively movable relation and a cavity therebetween opening outwardly receiving the stator and rotatable assembly unit in non-engaging relation; aligning the bearings and shaft by causing the bearings to move angularly relative to the axis of the shaft in the associated frame recesses to the desired positions primarily by supporting the full weight of the stator and rotatable assembly unit on the bores of the two bearings; securing the bearings firmly in the associated frame recesses while the bearing bores continue to support the stator and rotatable assembly unit; attaching the stator and single piece frame securely together; and releasing the stator and rotatable assembly for relative rotation.

2. A method of fabricating a small electric motor having a stator assembly and a rotatable assembly including a shaft; the method comprising the steps of: holding the stator and rotatable assemblies together as a unit in a non-movable relation with a fixed air gap of preselected dimensions formed therebetween, with a pair of self-aligning bearings having at least a partially spherical outer surface accommodating the shaft, and with a frame member formed from sheet material having a pair of spaced apart complementary recesses opening upwardly seating part of the spherical outer surface of said bearings in a relatively movable relation and a cavity therebetween opening upwardly receiving the stator and rotatable assembly unit in non-supporting relation; aligning the bearings and shaft by causing the bearings to move in the associated frame recesses to the desired positions primarily as a result of supporting the weight of the stator and rotatable assembly unit by the bearings; securing the bearings firmly in the associated frame recesses while the bearings continue to support the stator and rotatable assembly unit; attaching the stator and frame member securely together; and discontinuing holding the stator and rotatable assembly together as a unit to release them for relative rotation.

3. A method of fabricating a small electric motor having a stator and a rotatable assembly including a shaft; the method comprising the steps of: holding the stator and rotatable assembly together as a unit in a non-movable relation, with a fixed air gap of preselected dimensions provided therebetween, with the shaft being received in the bore of a pair of sleeve type bearings, with a frame including a pair of spaced apart bearing mounts having a fixed position with one another movably carrying the bearings relative to the shaft and frame, and with the stator and rotatable assembly unit and frame being in a generally non-engaging relation; supporting the weight of the stator and rotatable assembly unit on the bores of the two bearings thereby causing the bearings to move relative to both the shaft axis and the frame to derive the desired alignment of the bearings and shaft; attaching the bearings and the frame firmly together while the bearing bores continue to support the stator and rotatable assembly unit; securing the stator and frame rigidly together; and discontinuing holding the stator and rotatable assembly as a unit to release them for relative rotation.

4. A method of fabricating a small electric motor having a stator and a rotatable assembly including a shaft; the method comprising the steps of: holding the stator and rotatable assembly together as a unit in a non-movable relation, with a fixed air gap of preselected dimensions provided therebetween, with the shaft being accommodated by a pair of bearings with at least one bearing being of the self-aligning type, with a frame formed from sheet material including a pair of spaced apart bearing mounts having a fixed position with one another movably carrying the bearings relative to the shaft and frame, and with the stator and rotatable assembly unit and frame being in a generally non-engaging relation; supporting the weight of the stator and rotatable assembly unit by the two bearings in their associated mounts thereby causing the bearings to move relative to both the shaft axis and the frame to derive the desired alignment of the bearings and shaft; attaching the bearings and the frame firmly together while the bearing bores continue to support the stator and rotatable assembly unit; attaching the stator and frame rigidly together; and discontinuing holding the stator and rotatable assembly as a unit thereby releasing them for relative rotation.

References Cited
UNITED STATES PATENTS

| | | | |
|---|---|---|---|
| 3,023,332 | 2/1962 | St. Charles | 310—42 X |
| 3,096,451 | 7/1963 | Daughtery et al. | 310—42 |
| 3,156,838 | 11/1964 | Winther | 310—42 |
| 3,268,986 | 8/1966 | Lacy | 29—596 |
| 2,423,750 | 12/1947 | Benson. | |
| 2,763,802 | 9/1956 | Dolan. | |
| 3,165,816 | 1/1965 | Thompson. | |
| 3,172,197 | 3/1965 | Rutledge. | |
| 3,176,172 | 3/1965 | Thompson et al. | |
| 3,176,380 | 4/1965 | Wightman. | |
| 3,195,222 | 7/1965 | Rutledge. | |

CHARLIE T. MOON, *Primary Examiner.*

C. E. HALL, *Assistant Examiner.*